(12) United States Patent
Baek et al.

(10) Patent No.: US 10,812,536 B2
(45) Date of Patent: Oct. 20, 2020

(54) METHOD AND APPARATUS FOR PROVIDING QUALITY OF SERVICE FOR WEB-BASED REAL-TIME COMMUNICATION

(71) Applicant: Samsung Electronics Co., Ltd., Gyeonggi-do (KR)

(72) Inventors: Young-Kyo Baek, Seoul (KR); Song-Yean Cho, Seoul (KR); Sang-Soo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/399,198

(22) Filed: Apr. 30, 2019

(65) Prior Publication Data

US 2019/0261248 A1 Aug. 22, 2019

Related U.S. Application Data

(62) Division of application No. 14/753,953, filed on Jun. 29, 2015, now Pat. No. 10,321,385.

(30) Foreign Application Priority Data

Jun. 27, 2014 (KR) .................. 10-2014-0080246
Oct. 2, 2014 (KR) .................. 10-2014-0132987

(51) Int. Cl.
*H04L 29/06* (2006.01)
*H04W 48/08* (2009.01)
(Continued)

(52) U.S. Cl.
CPC .......... *H04L 65/1016* (2013.01); *H04L 65/80* (2013.01); *H04L 67/02* (2013.01);
(Continued)

(58) Field of Classification Search
None
See application file for complete search history.

(56) References Cited

U.S. PATENT DOCUMENTS 8,695,077 B1* 4/2014 Gerhard .............. H04L 63/0815
726/8
9,467,480 B2* 10/2016 Mandyam ........... H04L 65/1003
(Continued)

FOREIGN PATENT DOCUMENTS

WO WO 2013/155939 10/2013

OTHER PUBLICATIONS

Huawei, "WebRTC access to IMS W2 Interface", May 19-23, 2014, 3GPP TSG CT WG1 Meeting #87, 3GPP TS 24.322, pp. 1-9. (Year: 2014).*

(Continued)

*Primary Examiner* — Ayaz R Sheikh
*Assistant Examiner* — Faiyazkhan Ghafoerkhan
(74) *Attorney, Agent, or Firm* — The Farrell Law Firm, P.C.

(57) ABSTRACT

Disclosed is a method for web-based real-time communication by a user equipment (UE), including transmitting, to a web server, a message requesting information about an Internet protocol multimedia subsystem (IMS) network to which the UE is to access, receiving, from the web server, address information of the IMS network to which the UE is to access, in response to the transmitted message, when receiving, from the web server, an instruction to hold establishment of a bearer for a web-based real-time data service, restricting transmission of a signaling message for the web-based real-time data service until the bearer is established, and when sensing establishment of the bearer, transmitting, to an access point of the IMS network, at least (Continued)

one subsequent signaling message for the web-based real-time data service through the bearer.

8 Claims, 7 Drawing Sheets

(51) Int. Cl.
*H04L 29/08* (2006.01)
*H04W 80/04* (2009.01)
*H04W 76/12* (2018.01)
*H04W 12/06* (2009.01)

(52) U.S. Cl.
CPC ............ *H04W 48/08* (2013.01); *H04W 12/06* (2013.01); *H04W 76/12* (2018.02); *H04W 80/04* (2013.01)

(56) References Cited

U.S. PATENT DOCUMENTS

| | | | | |
|---|---|---|---|---|
| 10,321,385 | B2* | 6/2019 | Baek | H04L 65/1016 |
| 2014/0044123 | A1* | 2/2014 | Lawson | H04L 65/1023 |
| | | | | 370/352 |
| 2014/0219083 | A1 | 8/2014 | Mandyam | H04L 65/80 |
| | | | | 370/230 |
| 2014/0219167 | A1* | 8/2014 | Santhanam | H04W 28/0268 |
| | | | | 370/328 |
| 2014/0325078 | A1* | 10/2014 | Shan | H04W 48/18 |
| | | | | 709/227 |
| 2015/0033300 | A1* | 1/2015 | Timariu | H04L 65/1069 |
| | | | | 726/5 |
| 2015/0036495 | A1* | 2/2015 | Venkatachalam | |
| | | | | H04W 28/0215 |
| | | | | 370/235 |
| 2015/0078295 | A1* | 3/2015 | Mandyam | H04L 65/403 |
| | | | | 370/329 |
| 2015/0172879 | A1* | 6/2015 | Vaidya | H04W 4/60 |
| | | | | 455/466 |
| 2015/0195326 | A1* | 7/2015 | Suryavanshi | H04L 43/0852 |
| | | | | 709/231 |
| 2015/0200946 | A1* | 7/2015 | Horn | H04L 63/10 |
| | | | | 726/4 |
| 2015/0264106 | A1* | 9/2015 | Baek | H04W 76/12 |
| | | | | 709/203 |
| 2015/0264108 | A1* | 9/2015 | Ji | G06F 16/957 |
| | | | | 709/219 |
| 2015/0280963 | A1* | 10/2015 | Bollapalli | H04W 48/00 |
| | | | | 709/227 |
| 2015/0289167 | A1* | 10/2015 | Alex | H04L 41/0893 |
| | | | | 370/329 |
| 2015/0373056 | A1* | 12/2015 | Bouthemy | H04L 65/1006 |
| | | | | 709/203 |
| 2015/0382384 | A1* | 12/2015 | Baek | H04W 48/08 |
| | | | | 370/329 |
| 2016/0183156 | A1* | 6/2016 | Chin | H04L 61/2007 |
| | | | | 370/331 |
| 2016/0269315 | A1* | 9/2016 | Eriksson | H04L 47/781 |
| 2016/0315938 | A1* | 10/2016 | Kunz | H04W 12/06 |
| 2016/0337852 | A1* | 11/2016 | Timariu | H04L 65/1069 |
| 2017/0244765 | A1* | 8/2017 | Shan | H04L 5/0073 |
| 2019/0261248 | A1* | 8/2019 | Baek | H04L 65/1016 |

OTHER PUBLICATIONS

Pi-Chun Chen et al., "Quality of service support in 1x EV-do revision a systems", Bell Labs Technical Journal 11(4), 169-187 (2007).
3rd Generation Partnership Project; Technical Specification Group Services and System Aspects; Study on Web Real Time Communication (WebRTC) Access to IP Multimedia Subsystem (IMS); Stage 2 (Release 12), 3GPP TR 23.701 V12.0.0, Dec. 2013, 60 pages.
3rd Generation Partnership Project; Technical Specification Group Services and System Aspects; IP Multimedia Subsystem (IMS); Stage 2, (Release 12), 3GPP TS 23.228 V12.5.0, Jun. 2014, 312 pages.
International Search Report dated Sep. 25, 2015 issued in counterpart application No. PCT/KR2015/006488, 15 pages.
Huawei, "WebRTC Access to IMS W2 Interface", C1-142054, 3GPP TSG CT WG1 Meeting #87, May 19-23, 2014, 9 pages.
European Search Report dated Feb. 1, 2018 issued in counterpart application No. 15812742.3-1213, 16 pages.

* cited by examiner

METHOD AND APPARATUS FOR PROVIDING QUALITY OF SERVICE FOR WEB-BASED REAL-TIME COMMUNICATION

PRIORITY

This application is a Divisional Application of U.S. patent application Ser. No. 14/753,953, filed in the U.S. Patent and Trademark Office on Jun. 29, 2015, and claims priority under 35 U.S.C. § 119(a) to Korean Patent Application Serial Nos. 10-2014-0080246 and 10-2014-0132987, which were filed in the Korean Intellectual Property Office on Jun. 27, 2014 and Oct. 2, 2014, respectively, the contents of each of which are incorporated herein by reference.

BACKGROUND

1. Field of the Invention

The present invention relates generally a method and an apparatus for providing real-time communication over Internet protocol multimedia subsystems (IMSs), and more particularly, to a method and an apparatus for providing quality of service for web-based real-time communication.

2. Description of the Related Art

In order to respond to an increasing demand for enhanced mobile communication services, the 3rd Generation Partnership Project (3GPP) Long Term Evolution (LTE) is currently being standardized as a next-generation communication system. Standardization is also occurring for Internet Protocol (IP) Multimedia Subsystem (IMS), which is a technology providing multimedia services, such as voice or video services, through a packet switched (PS) network (or packet network) provided through a wired/wireless communication system including a mobile communication system.

Accordingly, techniques are being developed for supporting real-time communication (RTC) services through a web application of a web browser, irrespective of an operating system (OS) of a device, such as a terminal, without installation of a separate application (App) or plug-in. The standardization of web browsers supporting these RTC techniques, which is commonly referred to as WebRTC, is also occurring.

In order for a user equipment (UE) to use a WebRTC service, the UE provides various services including proper Quality of Service (QoS) and differentiated billing for multimedia traffic of WebRTC services.

In particular, a need exists for a technique for providing a higher priority to WebRTC traffic than normal web traffic, when a UE uses a WebRTC service.

SUMMARY

Accordingly, an aspect of the present invention is to provide a method and an apparatus for communicating information in a communication system.

Another aspect of the present invention is to provide a method and an apparatus for a UE to access an IMS network via the web for the WebRTC.

Another aspect of the present invention is to provide a method and an apparatus for selecting a network point, when a UE accesses an IMS network through a web browser.

Another aspect of the present invention is to provide a method and an apparatus for providing a proper QoS level to a WebRTC signaling message, in order to support a UE for the WebRTC through an IMS network.

Another aspect of the present invention is to provide a method and an apparatus for providing a higher priority to a WebRTC signaling message.

In accordance with an aspect of the present invention, a method for web-based real-time communication by a UE includes transmitting, to a web server, a message requesting information about an IMS network to which the UE is to access, receiving, from the web server, address information of the IMS network to which the UE is to access, in response to the transmitted message, when receiving, from the web server, an instruction to hold establishment of a bearer for a web-based real-time data service, restricting transmission of a signaling message for the web-based real-time data service until the bearer is established, and when sensing establishment of the bearer, transmitting, to an access point of the IMS network, at least one subsequent signaling message for the web-based real-time data service through the bearer.

In accordance with another aspect of the present invention, a UE for web-based real-time communication includes a modem, and a processor that controls the modem to transmit, to a web server, a message requesting information about an IMS network to which the UE is to access, receive, from the web server, address information about the IMS network to which the UE is to access, when receiving an instruction to hold establishment of a bearer for a web-based real-time data service from the web server, restrict transmission of a signaling message for the web-based real-time data service until the bearer is established, and when sensing establishment of the bearer, transmit, to an access point of the IMS network, at least one subsequent signaling message for the web-based real-time data service through the bearer.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, like reference numerals will be understood to refer to like parts, components, and structures.

DETAILED DESCRIPTION

Figure 1:
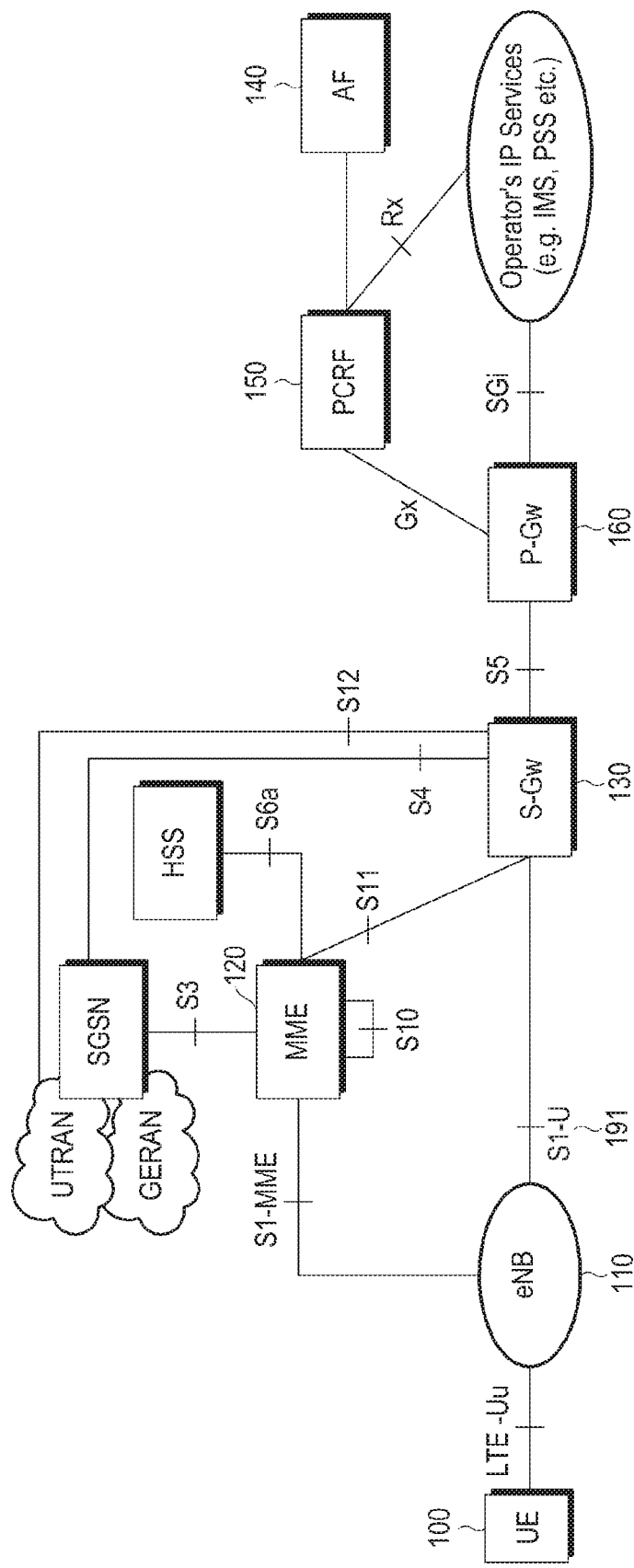
FIG. 1 illustrates a conventional LTE mobile communication system.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Additionally, operation steps of the procedures described herein and combinations of the procedures described herein may be performed by computer program instructions. Since the computer program instructions may be equipped in a processor of a general-use computer, a special-use computer, or other programmable data processing devices, the instructions executed through a processor of a computer or other programmable data processing devices may perform the steps described in connection with the procedures described herein. Since the computer program instructions may be stored in a computer-available or computer-readable memory that may be oriented to a computer or other programmable data processing devices to implement a function in a specified manner, the instructions stored in the computer-available or computer-readable memory may produce a product for providing instructions for performing the procedures described herein. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the procedures described herein.

Further, each step of the procedures described herein may represent a module, segment, or part of a code including one or more executable instructions for executing a specified logical function. Further, it should also be noted that in some replacement execution examples, the steps of the procedures described herein may occur in different orders. For example, two steps that are consecutively illustrated may also be performed substantially simultaneously or in a reverse order, depending on the corresponding procedure.

As used herein, the term "unit" may mean a software element or a hardware element such as a field-programmable gate array (FPGA) or an application specific integrated circuit (ASIC, but is not limited thereto. A unit may be configured in a storage medium that may be addressed or may be configured as one or more processors.

Accordingly, as an example, a unit may include elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a multimedia card.

Although the descriptions of the embodiments herein focus primarily on orthogonal frequency division multiplexing (OFDM)-based wireless communication systems, particularly, 3GPP evolved UMTS Terrestrial Radio Access (EUTRA) standards, the embodiments may also be applicable to other communication systems and services having similar technical backgrounds and channel types, without departing from the scope of the present invention.

FIG. 1 illustrates a conventional LTE mobile communication system.

Referring to FIG. 1, a radio access network (RAN) of an LTE mobile communication system includes an evolved Node B (eNB) or Node B 110, a mobile management entity (MME) 120, and a serving gateway (S-GW) 130.

A UE 100 accesses an external network via the eNB 110, the serving gateway 130, and a packet data network (PDN) gateway (P-GW) 160.

The eNB 110 is an RAN node and corresponds to a Base Station Controller (BSC) of a GSM EDGE Radio Access Network (GERAN) and a Radio Network Controller (RNC) of a Universal Terrestrial Radio Access Network (UTRAN) system. The ENB 110 is connected with the UE 100 through a radio channel and manages wireless communication of the UE 100 similarly to an RNC/BSC. The eNB 110 may simultaneously use several cells.

In LTE, all user traffic is served through a shared channel. Accordingly, there is a need for a device that compiles and schedules circumstance information of the UE 100 and other UEs, where the eNB 110 is in charge thereof.

The MME 120 is a device that performs various control functions. The MME 120 may be connected with multiple eNBs.

The serving gateway 130 is a device providing a data bearer. The serving gateway 130 generates or removes a bearer, under the control of the MME 120.

An application function (AF) 140 is a device that exchanges application-related information with a user at an application level. For example, an enhanced Proxy Call Session Control Function (eP-CSCF), which is an IMS network device, is a type of AF.

A Policy Charging and Rules Function (PCRF) 150 is a device for controlling a policy related to a user's QoS. The policy is defined by a Policy and Charging Control (PCC) rule, which is transferred to the PDN gateway 160 and is then applied by the PDN gateway 160. Specifically, the PDN gateway 160 may include a Policy and Charging rule Enforcement Function (PCEF) for applying the PCC rule.

"A User Plane (UP)" refers to a pathway connecting the UE 100 and the ENB 110, which is an RAN node, a pathway connecting the ENB 110, which is an RAN node, and the serving gateway 130, and a pathway connecting the serving gateway 130 and the PDN gateway 160. Among the pathways, the pathway between the UE 100 and the ENB 110 uses a radio channel that has severely limited resources.

A QoS may apply in bearer units to wireless communication systems, such as LTE systems. An EPS bearer may be used to transmit IP flows having the same QoS requirement. An EPS bearer may be designated a QoS-related parameter that may include a QoS Class Identifier (QCI) and an Allocation and Retaining Priority (ARP). The QCI is a parameter defining a QoS priority, and the ARP is a parameter used to determine whether to accept or reject generation of a new EPS bearer.

The EPS bearer corresponds to a Packet Data Protocol (PDP) context of a General Packet Radio Service (GPRS) system. An EPS bearer may belong to a PDN connection, which may have an Access Point Name (APN) as an attribute. When a PDN connection for an IMS service is generated, the PDN connection may be generated using a well-known IMS APN.

When the UE accesses a communication network through a web application of a web browser, the PDN connection for access may be generated through an APN for an Internet service or through an IMS APN.

In order to apply desired QoS and billing to traffic for a WebRTC service of the UE, the WebRTC service may be rendered to interoperate with an IMS network. For example, the UE may install a web application of a WebRTC client in the web browser, and access and register itself in the IMS network through the WebRTC client. Traffic caused by the WebRTC client is served through the IMS network.

Figure 2:
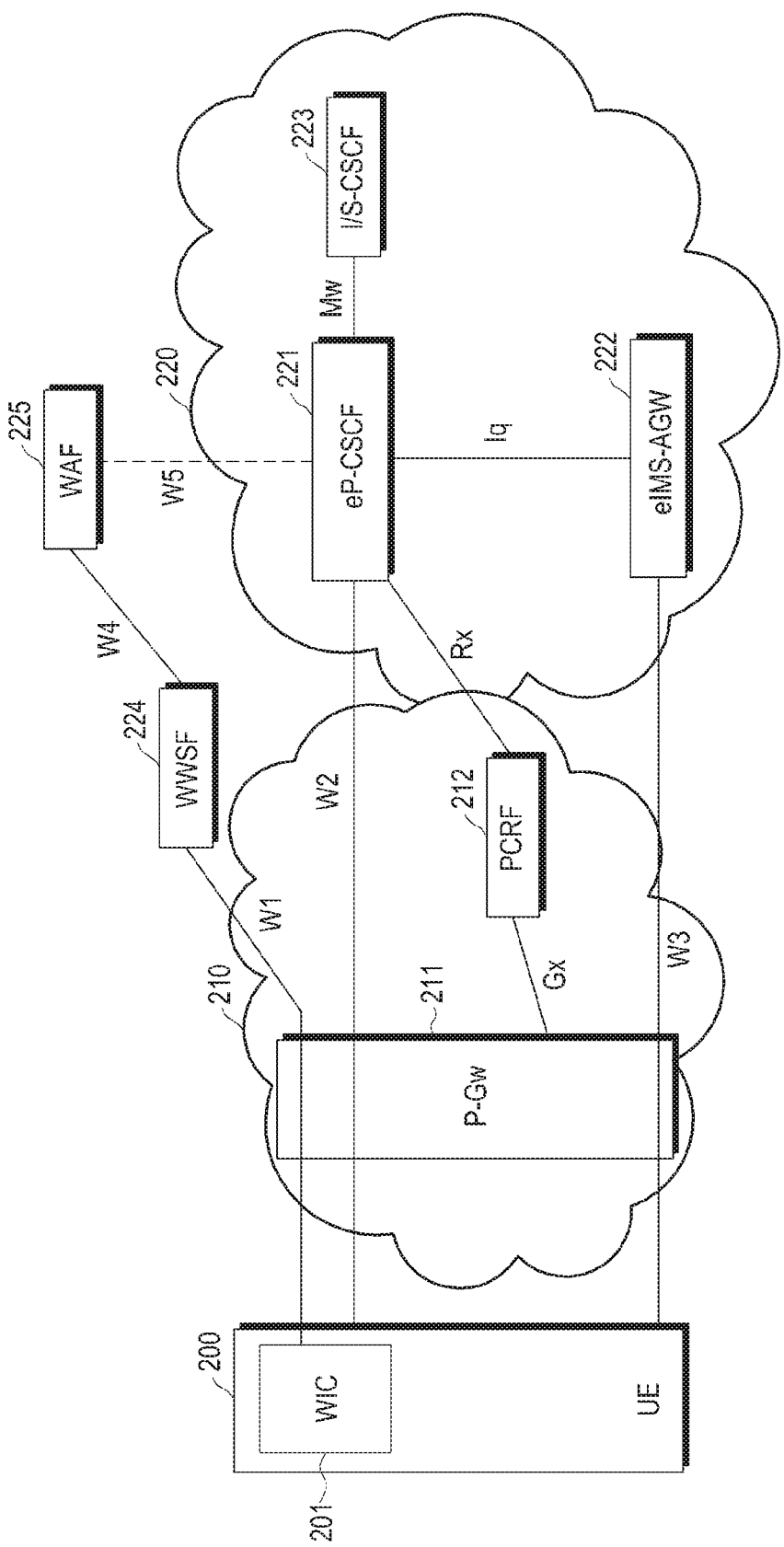
FIG. 2 illustrates a network for providing WebRTC through an IMS according to an embodiment of the present invention.

FIG. 2 illustrates a network for providing WebRTC through an IMS according to an embodiment of the present invention.

Referring to FIG. 2, a UE 200 accesses a mobile communication network 210, e.g., an LTE network, to receive a packet service. Packets generated by the UE 200 are transmitted through a PDN gateway (P-GW) 211 of the mobile communication network 210.

A WebRTC WebServer Function (WWSF) 224 is a web server that may download a WebRTC IMS Client (WIC) 201 in a web browser of the UE 200 and transfer, to the WIC 201, information for user authorization or information allowing the UE 200 to access an IMS network 220, e.g., the Uniform Resource Locator (URL) of an eP-CSCF 221.

In accordance with another embodiment of the present invention, among the functions of the WWSF 224, a user authorization function may be separated as a WebRTC Authorization Function (WAF) 225. The WAF 225 may issue an authorization token and transfer the authorization token to the WWSF 224. As another example, the WWSF 224 may be configured to include a WAF 225 for performing user authorization and issuance of an authorization token.

The eP-CSCF 221 is an IMS device in which an extended function for WebRTC has been added to a P-CSCF, which is a first point where the UE 200 accesses the IMS network 220. The eP-CSCF 221 includes a function for converting between an IMS control message and a control message transferred while communicating with the WIC 201 of the UE 200. For example, the eP-CSCF 221 may perform a function for controlling an enhanced IMS-Access Gateway (eIMS-AGW) 222 to serve traffic defined for the WebRTC.

Communication between the WIC 201 and the eP-CSCF 221 may be implemented in various schemes over a Websocket, such as a Session Initiation Protocol (SIP), a Representation State Transfer (REST)-based interface, and an Extensible Messaging and Presence Protocol (XMPP). The eP_CSCF 221 is in charge of translating SIP messages between the IMS network 220 and the schemes.

Websocket is a protocol for web-based bi-directional communication between a client (e.g., a user's browser) and a server. As Websocket does not use unnecessary request/response header data, it is appropriate for implementing a real-time service.

Although embodiments of the present invention are described using an SIP scheme over Websocket as an example in which a web application or WIC 201 of the UE 200 generates SIP signaling and an SIP message is communicated with the IMS network 220 in interoperation with the eP-CSCF 221 of the IMS network 220 through a secure Websocket connection, the embodiments of the present invention are not limited thereto and are also be applicable to other schemes.

The enhanced IMS-Access Gateway (eIMS-AGW) 222 is an IMS-AWG that adds a function for converting packets to be compatible with an IMS network, so that the IMS network may handle WebRTC traffic.

The UE 200 may download and install the WIC 201 from the WWSF 224 through a W1 interface, or the UE 200 may fetch a universal resource locator (URL) of the eP-CSCF 221 or an IMS ID to be used by the UE 200, from the WWSF 224, through user authorization. For example, the IMS ID may be an IP Multimedia Private Identity (IMPI) or an IP Multimedia Public Identity (IMPU). The WIC 201 accesses the eP-CSCF 221 and registers in the IMS network 220 by referencing information such as the URL of the eP-CSCF 221.

When the UE 200 does not fetch an IMPI or an IMPU from the WWSF 224, the WIC 201 performs a registration procedure through the eP-CSCF 221. For example, the WIC 201 may perform the IMS registration using an IMS Authentication and Key Agreement (AKA) procedure or an IMS authentication procedure using an SIP digest.

When the UE 200 fetches the IMPI or the IMPU from the WWSF 224, the WIC 201 performs IMS registration by conducting a Trust Node Authentication (TNA) procedure, without separate additional authentication. For example, the TNA procedure may include an operation in which the WAF 225 issues a security token and transfers the security token to the WIC 201 through the WWSF 224, an operation in which, when the WIC 201 sends an IMS registration message through the eP-CSCF 221, the WIC 201 transfers the security token and the IMS registration message, to the eP-CSCF 221, and an operation in which the eP-CSCF 221 authenticates the WIC 201 based on the security token.

As used herein, the term "QoS bearer" refers to an EPS bearer having a higher priority than an EPS bearer for general web traffic, i.e., an EPS bearer having a QCI with a higher priority than priorities allocated to other EPS bearers for web traffic, in order to transfer a WebRTC signaling message, i.e., a signaling message for a WebRTC service. For example, an EPS bearer having QCI=5 may become the QoS bearer for WebRTC service, and the EPS bearer may be used for serving IMS signaling.

When the UE 200 fetches the URL of the eP-CSCF 221 to which the WIC 201 is to access or the IMS ID that the UE 200 is to use through user authentication, from the WWSF 224, through a W1 interface, the WWSF 224 may download to the UE 200, the user's personal information, e.g., contact information, phone number list, WIC settings, etc., which have been previously stored.

Further, when a particular event occurs periodically or in response to a user request, the WIC 201 may upload, to the WWSF 224 or a designated cloud server, the user's personal information being used or stored in the WIC 201, e.g., contact information, phone number list, WIC settings, etc.

Accordingly, even when a user accesses the WWSF 224 using another UE, the user may avail itself of the WebRTC services in the same use environment using the user's personal information and WIC settings that may be downloaded from the WWSF 224.

Figure 3:
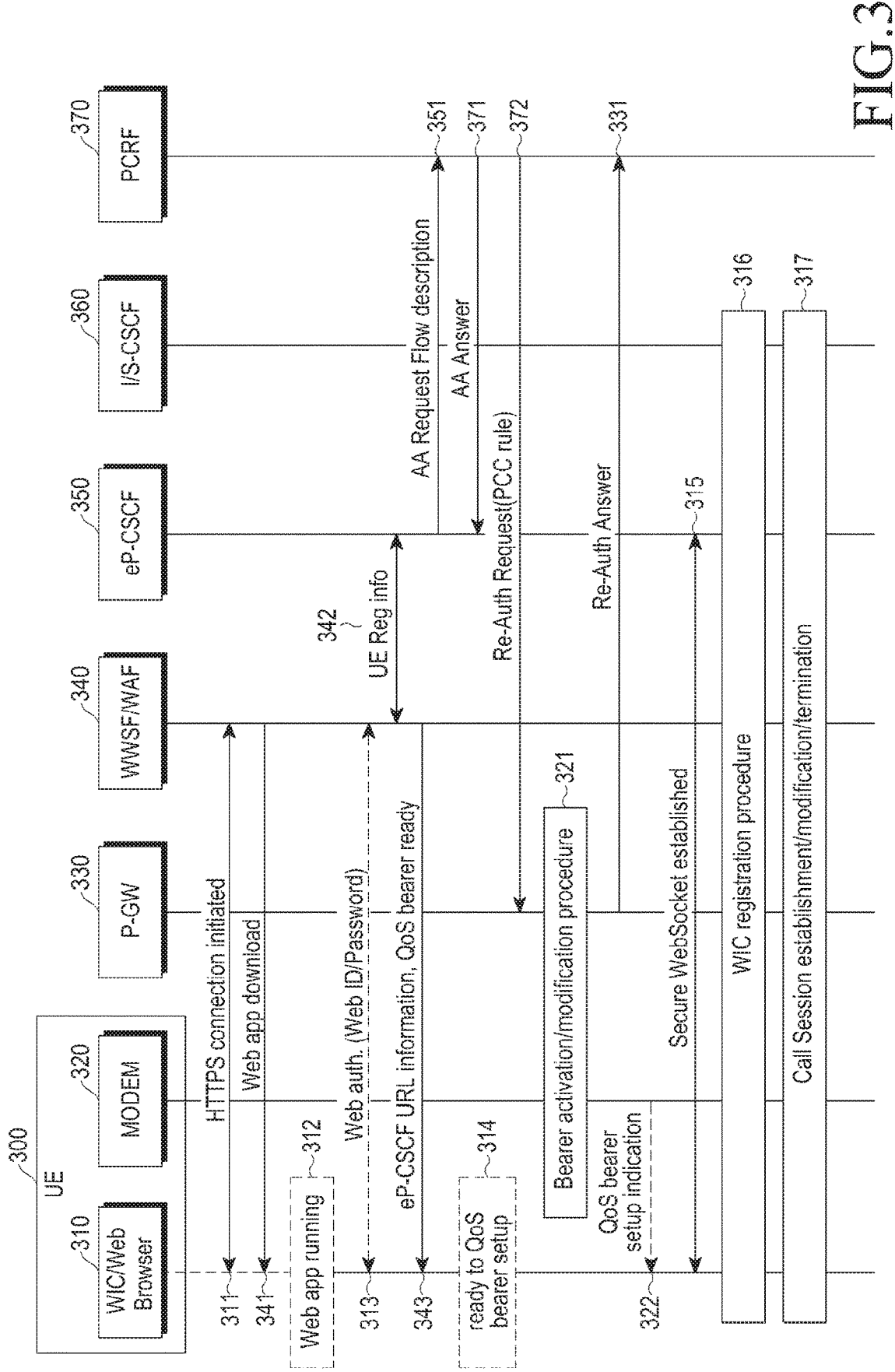
FIG. 3 is a signal flow diagram illustrating a procedure for generating a QoS bearer for WebRTC signaling according to an embodiment of the present invention.

FIG. 3 is a signal flow diagram illustrating a procedure for generating a QoS bearer for signaling for a WebRTC service according to an embodiment of the present invention.

Referring to FIG. 3, in step 311, a UE 300 accesses a WWSF/WAF 340 through a web browser 310 in order to obtain information for a WebRTC service.

In step 341, the web browser 310 performs authentication on the WWSF/WAF 340 through an encryption algorithm, such as a Transport Layer Security (TLS), and then downloads a web application for implementing the WebRTC from the WWSF/WAF 340. For example, the web application for the WebRTC is installed in the web browser 310 may be created in Javascript®. Alternatively, when the web application for the WebRTC is already installed in the UE 300, step 341 may be omitted.

In step 312, the web application installed for the WebRTC is executed on the web browser 310, and the web browser 310 operates as a client for the WebRTC service, which is denoted as a WebRTC IMS Client (WIC)/web browser 310 in FIG. 3.

In step 313, the WIC/web browser 310 accesses the WWSF/WAF 340 in order to obtain information for accessing an IMS network. For example, the information may include information on an eP-CSCF 350, which is an IMS entity that the UE 300 first accesses over the IMS network, e.g., a URL. In this case, the WWSF/WAF 340 may perform user authentication, based on information, such as a web ID and a password for security.

The WWSF/WAF 340 may select the eP-CSCF 350 to which the UE 300 is to gain access, using the information received from the WIC/web browser 310, e.g., information relating to a Public Land Mobile Network (PLMN) for identifying the network to which the UE 300 is linked to, and the WWSF/WAF 340 may designate an IMPI and/or IMPU to be assigned to the UE 300.

The WWSF/WAF 340 may also generate a security token for informing the IMS network that the authentication of the user has been successfully performed in the WWSF/WAF 340.

When the WWSF/WAF 340 requests a QoS bearer for signaling in interoperation with the eP-CSCF 350, the WWSF/WAF 340 may also transmit an indicator, such as a QoS bearer ready, which allows the UE 300 to perform an operation considering the use of the QoS bearer. In accordance with an embodiment of the present invention, the QoS bearer ready indicator may be used to instruct the UE 300 to wait until a QoS bearer is configured, without transmitting a WebRTC signaling message.

In step 343, the WWSF/WAF 340 transfers, to the WIC/web browser 310, all or some of the URL of the eP-CSCF 350 selected for the WIC/web browser 310, the IMPI and the IMPU allocated to the WIC/web browser 310, the security token, the QoS bearer ready indicator, and the user's personal information, such as a phone number list, WIC settings, etc.

After receiving the QoS bearer ready indicator, in step 314, the UE 300 waits until a QoS bearer relating to the WebRTC service is generated, in order to send an SIP signaling message.

When the WWSF/WAF 340 may request a QoS bearer for signaling in interoperation with the eP-CSCF 350, in step 342, the WWSF/WAF 340 transfers, to the eP-CSCF 350, information relating to the UE 300, such as UE Registration Information (UE Reg info) on the UE 300 in order to request establishment of a QoS bearer for signaling. For example, the UE registration information may include at least one of an IP address and/or port number used by the UE 300, billing-related information corresponding to an IMPU assigned to the UE 300, and subscription information, such as information on a time during which access to an IMS network is permitted. The IP address and/or port number of the UE 300 may be transferred from the UE 300 to the WWSF/WAF 340 when the UE 300 accesses the WWSF/WAF 340 or may be directly detected by the WWSF/WAF 340 when accessing the UE 300. Likewise, the billing-related information and subscription information may be stored or detected by the WWSF/WAF 340, or may be obtained from the UE 300 or another network entity.

In step 351, the eP-CSCF 350 determines to start a procedure for generating a QoS bearer for WebRTC signaling, based on the UE registration information transferred from the WWSF/WAF 340, and transfers an Authentication Application (AA) Request (AAR) message to a PCRF 370, e.g., through an Rx interface. The AAR message may include all or some of an IP address of the UE 300 and information for the UE 300 to access the eP-CSCF 350, e.g., information indicating that it is a flow for transmitting an IMS signaling.

In step 371, the PCRF 370 transmits an AA Answer (AAA) message corresponding to the AAR message to the eP-CSCF 350 and then generates a PCC rule for applying to a bearer for transmitting the WebRTC signaling.

In step 372, the PCRF 370 transmits, to a PDN gateway (P-GW) 330, a ReAuthentication (Re-Auth) request message including the PCC rule through a Gx interface.

For example, the PCC rule may include parameters designating a QoS with a higher priority for exchange of WebRTC signals, such as service data filter information and QoS parameters. For example, the QoS parameters may include at least one of a QCI, an ARP, and an authorized bit rate. A source IP address of the service data filter information may be set to an IP address of the UE 300, and a destination IP address may be set to an IP address of the eP-CSCF 350. A QCI value may be set to, e.g., 5, to indicate a QoS bearer level equal or similar to a bearer for transmission of IMS signaling.

In step 321, the PDN gateway 330 may transfer an update bearer request message to an MME, through a serving gateway, for the MME to perform an EPS bearer modification procedure for the UE 300, or the PDN gateway 330 may transfer a create bearer request message to the MME, through a serving gateway, for the MME to perform an EPS bearer activation procedure for the UE 300, in order for a QoS bearer for transmitting the WebRTC signaling to be generated. Accordingly, when the WebRTC signaling is transmitted through the QoS bearer, i.e., an EPS bearer with a higher priority, the WebRTC signaling may be processed with a higher QoS than other web traffic.

In step 322, a modem 320 may inform the WIC/web browser 310 that the QoS bearer has been generated.

In step 315, the WIC/web browser 310 establishes a Websocket connection with the eP-CSCF 350, based on the information transferred from the WWSF/WAF 340 in step 343, e.g., redirection information.

In step 316, the WIC/web browser 310 generates SIP signaling for IMS registration and transfers the SIP signaling through the Websocket connection to the eP-CSCF 350, which transmits the SIP signaling to a Serving CSCF (S-CSCF) 360 and performs IMS registration.

After the IMS registration is complete, in step 317, the WIC/web browser 310 performs a signaling procedure, such as establishment/modification/termination of a call session for the WebRTC service through the Websocket connection.

In steps 316 and 317, signaling messages for IMS registration or call control are transferred through the QoS bearer.

Alternatively, step 315 may be performed before the WIC/web browser 310 is notified that the QoS bearer has been generated in step 322.

Further, signaling messages generated for configuring the Websocket connection in step 315 may be transmitted through the QoS bearer or a preset bearer for web traffic.

Alternatively, in step 313, the WIC/web browser 310 of the UE 300 may include an IP address and/or port number of the UE 300, together with the web ID and password, in the message transmitted to the WWSF/WAF 340 for IMS network access. Then, in step 342, the WWSF/WAF 340 includes the IP address and/or port number in the UE registration information and transfers the same to the eP-CSCF 350. The eP-CSCF 350 transfers the IP address and/or port number to the PCRF 370. The PCRF 370 may use the IP address and/or port number to generate a PCC rule for the QoS bearer.

As another alternative, the WIC/web browser 310 of the UE 300 may include information on a real-time communication function supportable by the UE 300 in the message transmitted to the WWSF/WAF 340 for IMS network access and transfer the same to the WWSF/WAF 340. The WWSF/WAF 340 may authenticate the user and obtain subscription information on the authenticated user from a storage device, such as a database. The WWSF/WAF 340 uses all or some of the information on the supportable real-time communication function received from the UE 300 and the subscription information on the authenticated user to determine a QoS level to be supported for the UE 300 (e.g., an indicator indicating a level of service quality, such as Gold/Silver/Bronze), and in step 342, the WWSF/WAF 340 transfers the QoS level with the IP address and/or port number of the UE 300, to the eP-CSCF 350. The eP-CSCF 350 determines a parameter for indicating adjustment of the QCI of the bearer to be generated or modified by referencing the QoS level while triggering generation of a bearer for signaling for the WebRTC and transfers the parameter to the PCRF 370 in step 351, or the eP-CSCF 350 may transfer the QoS level to the PCRF 370 in step 351. The PCRF 370 directly adjusts the QCI of the bearer to be generated or modified by referencing the QoS level, generates or modifies a new PCC rule, and transfers the new PCC rule to the P-GW 330 in step 372. In step 321, the P-GW 330 may generate or modify a bearer for transmission of a signaling message for the WebRTC by applying the new PCC rule.

The eP-CSCF 350 may adjust the QCI for the bearer for transmitting call traffic by referencing the QoS level received from the WWSF/WAF 340 while generating or modifying the call session, like in step 317, and may transfer the information on the call session (i.e., the adjusted QCI) to the PCRF 370 or may directly transfer the QoS level to the PCRF 370 to allow the PCRF 370 to directly adjust the QCI. The PCRF 370 generates or modifies the new PCC rule by referencing the adjusted QCI and transfers the new PCC rule to the P-GW 330. Thereafter, the P-GW 330 may generate or modify a bearer for transmission of call traffic by applying the new PCC rule.

Figure 4:
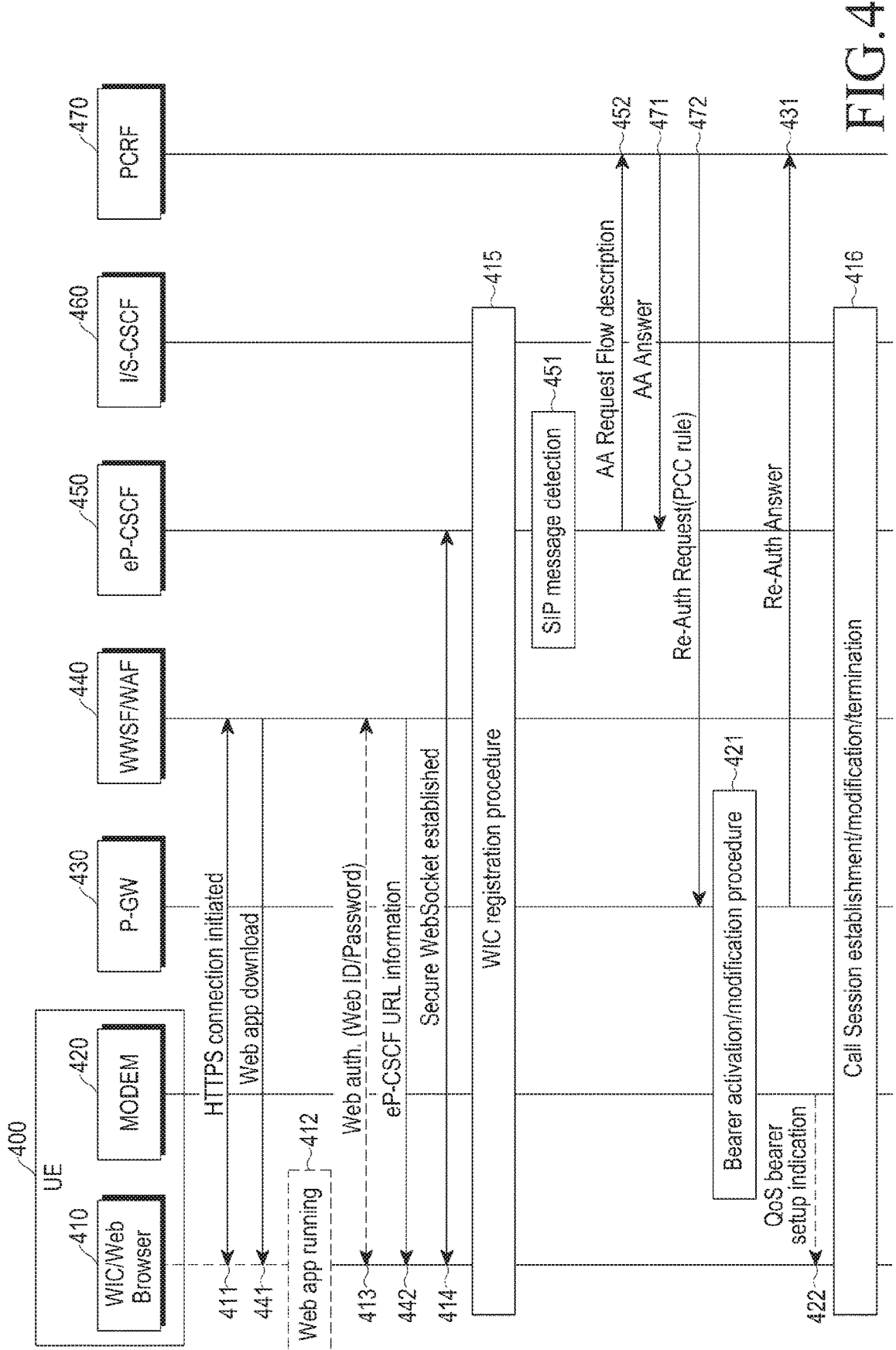
FIG. 4 is a signal flow diagram illustrating a procedure for generating a QoS bearer for WebRTC signaling according to an embodiment of the present invention.

FIG. 4 is a signal flow diagram illustrating a procedure for generating a QoS bearer for signaling for a WebRTC service according to an embodiment of the present invention.

Referring to FIG. 4, in step 411, a UE 400 accesses a WWSF/WAF 440 through a web browser 410, in order to obtain information for a WebRTC service.

In step 441, the web browser 410 performs authentication on the WWSF/WAF 440 through an encryption algorithm, such as the TLS, and then downloads a web application for implementing the WebRTC from the WWSF/WAF 440. For example, the web application for the WebRTC that is installed in the web browser 410 may be created in Javascript®.

Alternatively, when the web application for the WebRTC is already installed in the UE 400, step 441 may be omitted.

In step 412, when the web application installed for the WebRTC is executed on the web browser 410, the web browser 410 operates as a client, which is denoted as WIC/web browser 410 in FIG. 4.

In step 413, the WIC/web browser 410 accesses the WWSF/WAF 440 in order to obtain information for accessing an IMS network. For example, the information may include information on an eP-CSCF 450, which is an IMS entity that the UE 400 first accesses over the IMS network, e.g., a URL. For example, the WWSF/WAF 440 may perform user authentication based on a web ID and a password for security.

The WWSF/WAF 440 may select the eP-CSCF 450 to which the UE 400 is to access using the information received from the WIC 410, e.g., information relating to a PLMN for identifying the network to which the UE 400 is linked to, and the WWSF/WAF 440 may designate an IMPI and/or an IMPU to be assigned to the UE 400. The WWSF/WAF 440 may generate a security token for informing that the authentication has been successfully performed in the WWSF/WAF 440.

In step 442, the WWSF/WAF 440 transfers, to the WIC/web browser 410, all or some of the URL of the eP-CSCF 450 selected for the WIC/web browser 410, the IMPI and/or the IMPU allocated to the WIC/web browser 410, the security token, and a user's personal information, such as a phone number list, WIC settings, etc.

In step 414, the WIC/web browser 410 of the UE 400 sets up a Websocket connection with the eP-CSCF 450, based on the redirection information provided from the WWSF/WAF 440.

In step 415, the WIC/web browser 410 generates SIP signaling for IMS registration and performs IMS registration to an S-CSCF 460 of the IMS network, through the eP-CSCF 450, using the Websocket connection. For example, the SIP signaling is transferred to the IMS network through a bearer for normal web traffic.

The SIP signaling message transmitted from the WIC/web browser 410 of the UE 400 first arrives at the eP-CSCF 450 in the IMS network and is transferred to an I/S-CSCF 460 by the eP-CSCF 450.

In step 451, after receiving the SIP message transferred through the Websocket connection, the eP-CSCF 450 detects that signaling relating to the WebRTC has been transmitted through a bearer for web traffic.

Alternatively, the eP-CSCF 450 may detect that the WebRTC signaling has been transmitted through the bearer for web traffic by identifying that the WebRTC signaling message has been generated from a PDN gateway for web traffic.

After detecting the WebRTC signaling, the eP-CSCF 450 determines to start a procedure for generating a QoS bearer for WebRTC signaling and transfers an AAR message to a PCRF 470 through an Rx interface in step 452. The AAR message may include all or some of an IP address of the UE 400 and/or information for the UE 400 to access the eP-CSCF 450, e.g., information indicating that it is a flow for transmitting an IMS signaling.

In step 471, the PCRF 470 transmits an AA Answer (AAA) message corresponding to the AAR message to the eP-CSCF 450 and generates a PCC rule for applying to a flow for transmitting the IMS signaling.

In step 472, the PCRF 470 transmits, to a PDN gateway (P-GW) 430, a ReAuthentication (Re-Auth) request message including the PCC rule through a Gx interface.

The PCC rule may include parameters designating a QoS with a higher priority for signaling of the WebRTC, e.g., service data filter information and QoS parameters. For example, the QoS parameters include at least one of a QCI, an ARP, and an authentication bit rate.

A source IP address of the service data filter information is set to an IP address of the UE 400, and a destination IP address is set to an IP address of the eP-CSCF 450. For example, the QCI value may be set to 5 to indicate a QoS bearer equal to a bearer for transmission of IMS signaling.

In step 421, the PDN gateway 430 transfers a bearer request update message to an MME, through a serving gateway, for the MME to modify the EPS bearer for the UE 400, or transfers a bearer request generate message to the MME, through the serving gateway, for the MME to activate an EPS bearer for the UE 400, in order to generate a QoS bearer for IMS signaling between the IMS network and a modem 420 of the UE 400.

In step 422, the modem 420 may inform the WIC/web browser 410 that the QoS bearer has been generated.

In step 416, the WIC/web browser 410, after being notified that the QoS bearer has been generated, transfers an SIP message including the WebRTC signaling to the eP-CSCF 450 through the QoS bearer.

Figure 5:
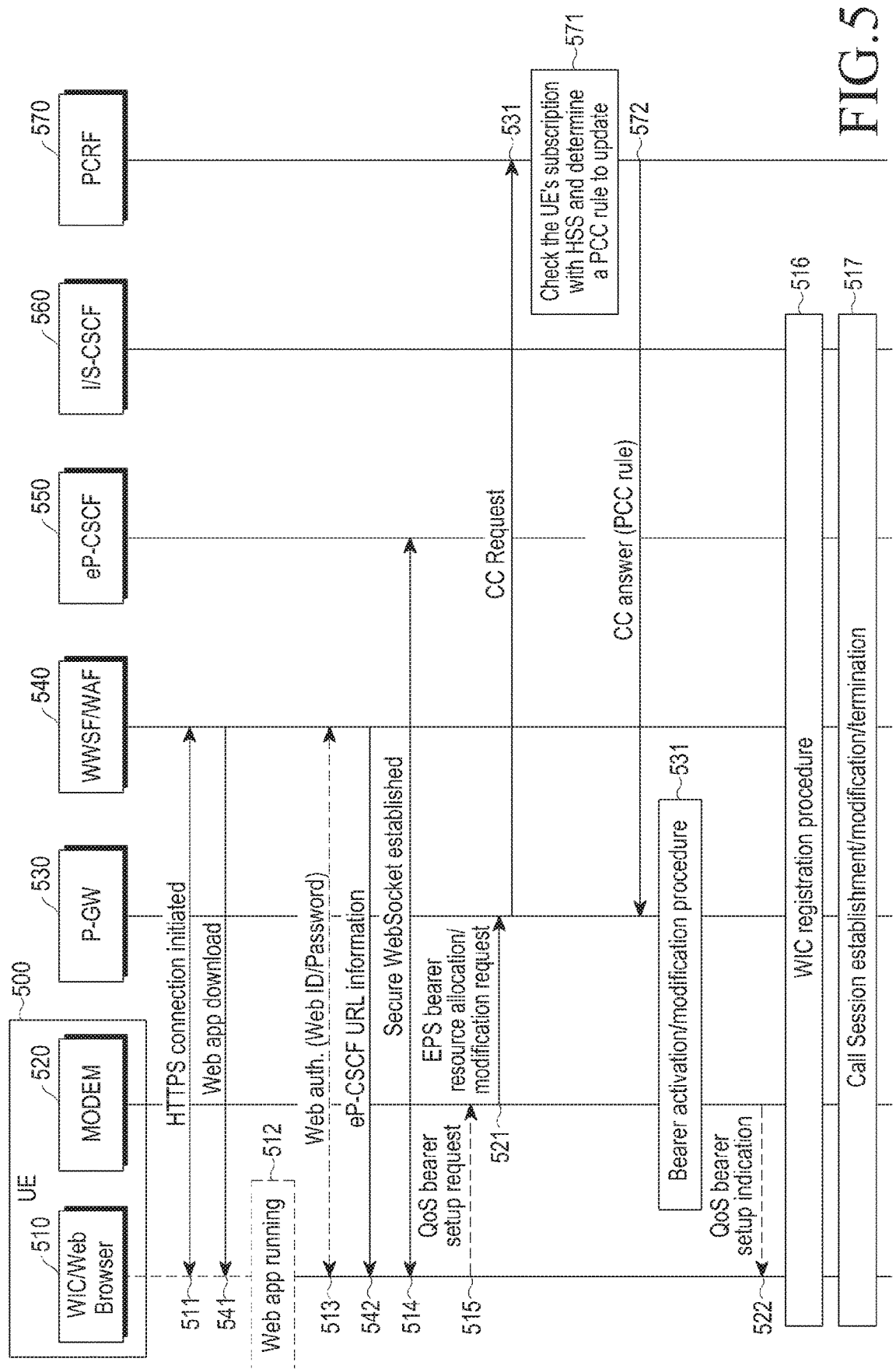
FIG. 5 is a signal flow diagram illustrating a procedure for generating a QoS bearer for WebRTC signaling according to an embodiment of the present invention.

FIG. 5 is a signal flow diagram illustrating a procedure for generating a QoS bearer for signaling for a WebRTC service according to an embodiment of the present invention.

Referring to FIG. 5, in step 511, a UE 500 accesses a WWSF/WAF 540 through a web browser 510, in order to obtain information for a WebRTC service.

In step 541, the web browser 510 performs authentication on the WWSF/WAF 540 through an encryption algorithm, such as TLS, and then downloads a web application for implementing the WebRTC, from the WWSF/WAF 540. For example, the web application for the WebRTC that is installed in the web browser 510 may be created in Javascript®.

Alternatively, when the web application for the WebRTC is already installed in the UE 500, step 541 may be omitted.

In step 512, when the web application installed for the WebRTC is executed on the web browser 510, the web browser 510 operates as a client for the WebRTC service, which is denoted as WIC/web browser 510 in FIG. 5.

In step 513, the WIC/web browser 510 accesses the WWSF/WAF 540 in order to obtain information for accessing an IMS network. For example, the information may include a URL an eP-CSCF 550, which is an IMS entity that the UE 500 first accesses over the IMS network. For example, the WWSF/WAF 540 may perform user authentication based on a web ID and a password for security.

The WWSF/WAF 540 may select the eP-CSCF 550 to which the UE 500 is to access, based on the information received from the WIC 510, e.g., information relating to a PLMN for identifying the network to which the UE 500 is linked to, and the WWSF/WAF 540 may designate an IMPI and/or an IMPU to be assigned to the UE 500. The WWSF/WAF 440 may generate a security token for informing that the authentication has been successfully performed in the WWSF/WAF 440.

In step 542, the WWSF/WAF 540 transfers, to the WIC/web browser 510, all or some of the URL of the eP-CSCF 550 selected for the WIC/web browser 510, the IMPI and/or the IMPU allocated to the WIC/web browser 510, the security token, and a user's personal information, such as a phone number list, WIC settings, etc.

In step 514, the WIC/web browser 510 of the UE 500 establishes a Websocket connection with the eP-CSCF 550, based on the redirection information provided from the WWSF/WAF 540.

The WIC/web browser 510 may perform a procedure for generating a QoS bearer for transmitting the WebRTC signaling message before transmitting the WebRTC signaling through the Websocket connection.

In step 515, the WIC/web browser 510 may send an indicator requesting generation of a QoS bearer to the modem 520.

After obtaining information on supportable QoS of the subscriber from a Universal Integrated Circuit Card (UICC) or a Subscriber Identity Module (SIM), in step 521, the modem 520 requests generation of a bearer of a desired QoS by sending an EPS bearer resource allocation request or an EPS bearer resource modification request to an MME, which transfers the request to the P-GW 530.

In step 531, the P-GW 530 transmits a Credit Control (CC) request message to the PCRF 570 to inquire about whether the QoS bearer may be generated.

In step 571, the PCRF 570 determines whether the QoS bearer may be generated through support of a Home Subscriber Server (HSS).

In step 572, the PCRF 570 transfers a PCC rule modified as per the determination to the P-GW 530 through the CC response message. The PCC rule may include parameters designating a QoS with a higher priority for signaling of the WebRTC, e.g., service data filter information and QoS parameters. For example, the QoS parameters include at least one of a QCI, an ARP, and an authentication bit rate.

In step 531, the P-GW 530 generates a QoS bearer with the modem 520 of the UE 500, based on the PCC rule.

After the generation of the QoS bearer is complete, in step 522, the modem 520 informs the WIC 510/web browser that the generation of the QoS bearer has been complete.

In steps 516 and 517, the WIC/web browser 510 communicates WebRTC signaling through the QoS bearer. That is, the WIC/web browser 510 generates the SIP signaling for IMS registration and uses the Websocket connection to transmit the SIP signaling to the S-CSCF 560 of the IMS network through the eP-CSCF 550, in order to perform the IMS registration. Here, the SIP signaling is transferred to the IMS network through the QoS bearer generated in steps 515 to 522.

The SIP signaling first arrives at the eP-CSCF 550 in the IMS network and is transferred to an I/S-CSCF 560 by the eP-CSCF 550.

Alternatively, the WIC/web browser 510 may send, to the modem 520, an indicator requesting generation of a QoS bearer in step 515, when an emergency occurs and communication is required. Thereafter, the WIC/web browser 510 may generate a QoS bearer through steps 521, 531, 571, 572, 531, and 522 and may perform an emergency call through the QoS bearer for emergency.

Figure 6:
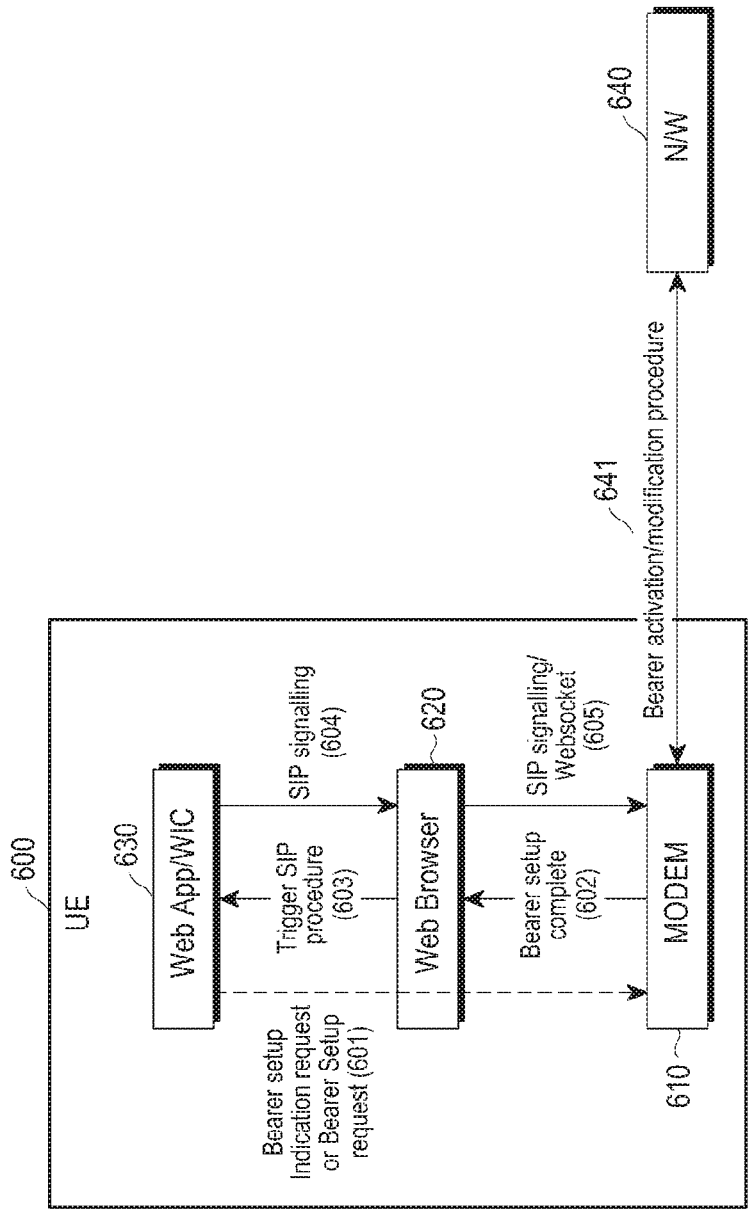
FIG. 6 illustrates a UE according to an embodiment of the present invention.

FIG. 6 illustrates a UE according to an embodiment of the present invention. Although FIG. 6 illustrates a hardware structure of the UE including components that are functionally distinguished from each other, implementations of the present embodiment are not limited to the illustration.

Referring to FIG. 6, a UE 600 includes a modem 610 for communicating and processing wireless signals and messages, a web browser 620, and a WIC 630, which is a web application executed by the web browser 620. The web browser 620 and the WIC 630 may be logical entities that are executed by a processor that communicates with the modem 610 and executes the WIC 630 through the web browser 620.

When an SIP signaling message is generated from the WIC 630 before a QoS bearer for WebRTC is generated by the UE 600, the WIC 630 abstains from transmitting the SIP signaling message and waits for generation of a QoS bearer. In this case, the WIC 630 may send, through the web browser 620 to the modem 610, a bearer setup instruction request signal for requesting the modem 610 to inform that a QoS bearer is generated or a bearer setup request signal 601 for requesting the modem 610 to generate a QoS bearer.

When the UE 600 generates a QoS bearer for communicating an SIP message through an EPS bearer activation procedure or an EPS bearer modification procedure with an access network 640, the modem 610 transmits a bearer setup complete signal 602 to the web browser 620, indicating that a QoS bearer has been generated. The web browser 620 transmits an SIP procedure trigger signal 603 to the WIC 630, indicating that the QoS bearer is generated, which allows the WIC 630 to start transmission of SIP signaling.

When the WIC 630 transfers an SIP message to the web browser 620, in response to the SIP procedure trigger signal 603, the web browser 620 converts the SIP message into an SIP message over a Websocket connection and transfers the SIP message to the modem 610. The modem 610 transfers the SIP message over the Websocket connection to the access network 640 through the QoS bearer. Likewise, the UE 600 receives, through the QoS bearer, from an eP-CSCF of an IMS network, an SIP message over the Websocket connection.

Alternatively, when waiting for generation of a QoS bearer for WebRTC or transmitting the bearer setup instruction request signal 601 to the modem 610, the WIC 630 or the web browser 620 starts a timer, and when a QoS bearer for WebRTC is not generated before the timer expires, the WIC 630 or the web browser 620 may send the SIP message through a normal Internet bearer.

As another alternative, when a QoS bearer is generated by the modem 610, similar to step 421 of FIG. 4, the modem 610 transmits a bearer setup complete signal 602 to the web browser 620, indicating that the QoS bearer has been generated. The SIP message transferred from the WIC 630 is then delivered to the network 640 by the QoS bearer through a Websocket connection, and the SIP message transmitted through the Websocket connection from the eP-CSCF of the IMS network is also received by the UE 600 through the QoS bearer.

Figure 7:
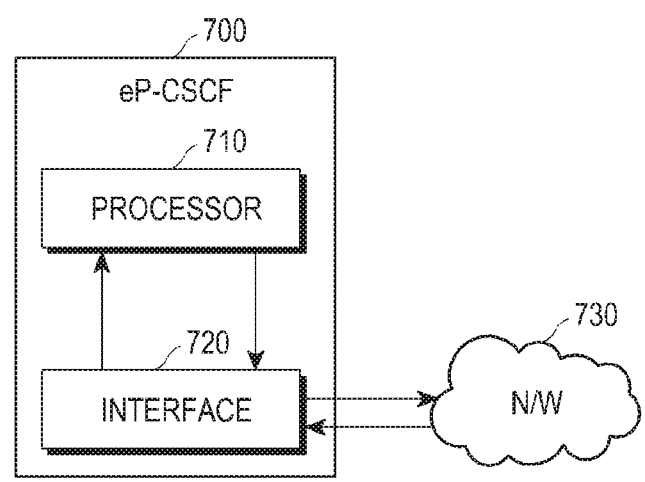
FIG. 7 illustrates a network entity according to an embodiment of the present invention.

FIG. 7 illustrates a network entity according to an embodiment of the present invention. Although FIG. 7 illustrates a hardware structure of the UE including components that are functionally distinguished from each other, implementations of the present embodiment are not limited to the illustration. For example, the network entity illustrated in FIG. 7 may be an eP-CSCF in an IMS domain.

Referring to FIG. 7, the network entity 700 includes an interface 720 for communication of a message with another network entity over a network 730 and a processor 710 for processing the message.

The processor 710 establishes a Websocket connection with a UE and then monitors whether the message received by the interface 720 is an SIP message over the Websocket connection. For example, the processor 710 may monitor whether the SIP message is received over the Websocket connection.

As another example, the processor 710 may determine whether the SIP message includes a WebRTC signaling when the SIP message is received from an Internet domain related to the WebRTC signaling.

When the SIP message over Websocket is detected or when the SIP message related to the WebRTC signaling is detected, the processor 710 determines to start a procedure for generating a QoS bearer for the WebRTC signaling and sends a request for configuring a QoS bearer for WebRTC signaling for the UE to another network entity controlling the QoS of the UE, e.g., a PCRF, through the interface 720.

After the QoS bearer is set up for the UE, the SIP message over Websocket is transferred to the network entity 700 using the QoS bearer.

As described above, according to an embodiment of the present invention, a UE may transfer a WebRTC signaling message through a QoS bearer with a higher priority than normal web traffic, when accessing an IMS network in order to receive a service through a web application for a WebRTC service. Accordingly, the UE may avail itself of the IMS service at the same level as the existing service through an IMS client, while using a web application.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for web-based real-time communication by a user equipment (UE), the method comprising:
   transmitting, to a web server, a message requesting information about an Internet protocol multimedia subsystem (IMS) network to which the UE is to access;
   receiving, from the web server, address information regarding a network entity of the IMS network selected based on the message;
   based on the web server supporting a function of requesting a bearer for a web-based real-time data service in interoperation with the selected network entity, receiving an instruction to hold a transmission of a signaling message;
   based on the instruction, restricting the transmission of the signaling message for the web-based real-time data service until the bearer is established; and
   when sensing establishment of the bearer, transmitting, to an access point of the IMS network, at least one subsequent signaling message for the web-based real-time data service through the bearer.

2. The method of claim 1, wherein the message requesting the information about the IMS network includes at least one of a web identifier (ID), a password for user authentication of the UE, an Internet protocol (IP) address of the UE, and a port number of the UE.

3. The method of claim 1, wherein the bearer for the web-based real-time data service has a higher priority than another bearer for web traffic.

4. The method of claim 1, further comprising transmitting, from a modem of the UE to a client of the web-based real-time data service, a signal indicating that the bearer is established.

5. A user equipment (UE) for web-based real-time communication, the UE comprising:
   a modem; and
   a processor that controls the modem to:
   transmit, to a web server, a message requesting information about an Internet protocol multimedia subsystem (IMS) network to which the UE is to access,
   receive, from the web server, address information regarding a network entity of the IMS network selected based on the message,
   based on the web server supporting a function of requesting a bearer for a web-based real-time data service in interoperation with the selected network entity, receive an instruction to hold a transmission of a signaling message,
   based on the instruction, restrict the transmission of the signaling message for the web-based real-time data service until the bearer is established, and
   when sensing establishment of the bearer, transmit, to an access point of the IMS network, at least one subsequent signaling message for the web-based real-time data service through the bearer.

6. The UE of claim 5, wherein the message requesting the information about the IMS network includes at least one of a web identifier (ID), a password for user authentication of the UE, an Internet protocol (IP) address of the UE, and a port number of the UE.

7. The UE of claim 5, wherein the bearer for the web-based real-time data service has a higher priority than another bearer for web traffic.

8. The UE of claim 5, wherein the modem transmits, to the processor, a signal indicating that the bearer is established.

* * * * *